United States Patent
Yoo

(10) Patent No.: US 9,049,401 B2
(45) Date of Patent: Jun. 2, 2015

(54) APPARATUS AND METHOD FOR PROVIDING DIGITAL MULTIMEDIA BROADCAST SERVICE USING AN EXTERNAL DEVICE AND A DIGITAL TV

(71) Applicant: Samsung Electronics Co., Ltd., Gyeonggi-do (KR)

(72) Inventor: Cheol-Sun Yoo, Daegu (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 13/908,231

(22) Filed: Jun. 3, 2013

(65) Prior Publication Data
US 2013/0258196 A1 Oct. 3, 2013

Related U.S. Application Data

(63) Continuation of application No. 12/696,289, filed on Jan. 29, 2010, now Pat. No. 8,456,573.

(30) Foreign Application Priority Data

Feb. 10, 2009 (KR) .................. 10-2009-0010459

(51) Int. Cl.
| | |
|---|---|
| H04N 3/27 | (2006.01) |
| H04N 5/45 | (2011.01) |
| H04N 7/173 | (2011.01) |
| H04N 5/44 | (2011.01) |
| H04H 60/80 | (2008.01) |
| H04N 21/41 | (2011.01) |
| H04N 21/431 | (2011.01) |
| H04N 21/4363 | (2011.01) |
| H04H 20/30 | (2008.01) |

(52) U.S. Cl.
CPC ............ *H04N 5/4403* (2013.01); *H04H 20/30* (2013.01); *H04H 60/80* (2013.01); *H04H 2201/11* (2013.01); *H04N 21/4122* (2013.01); *H04N 21/4126* (2013.01); *H04N 21/4316* (2013.01); *H04N 21/4363* (2013.01)

(58) Field of Classification Search
None
See application file for complete search history.

(56) References Cited

U.S. PATENT DOCUMENTS

| | | | | |
|---|---|---|---|---|
| 6,052,740 | A | * | 4/2000 | Frederick ........................... 710/8 |
| 2004/0027996 | A1 | * | 2/2004 | Birdwell et al. ............... 370/270 |
| 2005/0036068 | A1 | * | 2/2005 | Shin .............................. 348/565 |
| 2005/0268321 | A1 | * | 12/2005 | Milirud et al. ................ 725/118 |
| 2008/0246851 | A1 | * | 10/2008 | Jung et al. .................. 348/222.1 |

FOREIGN PATENT DOCUMENTS

| | | |
|---|---|---|
| JP | 11-196345 A | 7/1999 |
| KR | 10-2007-0000762 A | 1/2007 |

* cited by examiner

*Primary Examiner* — Jefferey Harold
*Assistant Examiner* — Sean Haiem
(74) *Attorney, Agent, or Firm* — Cha & Reiter, LLC

(57) ABSTRACT

An apparatus and a method for providing a Digital Multimedia Broadcasting (DMB) service using a digital TeleVision (TV) and an external device are provided. It is determined whether a received broadcast channel supports a Multi Mode Service (MMS), and if so, one of subchannels included in the broadcast channel is set to a main channel. The digital TV reproduces a broadcast signal via the main channel, and broadcast signals of subchannels excluding the main channel are transmitted to at least one external device in communication with the digital TV.

22 Claims, 6 Drawing Sheets

APPARATUS AND METHOD FOR PROVIDING DIGITAL MULTIMEDIA BROADCAST SERVICE USING AN EXTERNAL DEVICE AND A DIGITAL TV

CLAIM OF PRIORITY

This is a Continuation of U.S. application Ser. No. 12/696,289 filed on Jan. 29, 2010 which in turn claims the benefit of an earlier Korean Patent application filed in Korean Intellectual Property Office on Feb. 10, 2009 and assigned Serial No. 10-2009-0010459, the entire disclosure of which is hereby incorporated by reference.

BACKGROUND OF THE INVENTION

1. Field of the Invention

The present invention relates to an apparatus and a method for providing a Digital Multimedia Broadcasting (DMB) service using an external device and a digital TeleVision (TV). More particularly, the present invention relates to an apparatus and a method for connecting an external device with a digital TV and providing a MultiMode Service (MMS) in a DMB system.

2. Description of the Related Art

A Digital Multimedia Broadcasting (DMB) provides up-to-date broadcasting, such as radio broadcasting that uses a satellite, ground waves, or sky waves, TV broadcasting, and data for mobile communication.

Today, a digital TV provides a Picture In Picture (PIP) technique or a Picture By Picture (PBP) technique which reproduces two or more image signals on one screen to allow a user to view a plurality of images. For example, the digital TV provides a function of dividing one screen into two screens to allow a user to simultaneously view images of two broadcast channels.

Recently, a Multi Mode Service (MMS) technique for transmitting a plurality of broadcast signals via one broadcast channel has been developed. For example, as illustrated in FIG. 1, developing from transmitting one High Definition (HD) class broadcast signal using a bandwidth of about 6 MHz conventionally, recently, a technique for dividing the bandwidth of about 6 MHz into bandwidths of about 2 MHz, and transmitting different three Standard Definition (SD) class broadcast signals is being studied. Here, the HD and SD are image standards provided by the DMB. The SD provides resolution similar to that of an image provided by the conventional analog broadcast system, and the HD provides four to five times higher resolution than that of the SD.

The above-described MMS technique transmits screens shot by three cameras via one broadcast channel in the case where a plurality of cameras perform shooting as in a ball park to allow a user to view all three screens shot by the three cameras using a PIP or PBP function of a digital TV, or select and view only one desired screen.

However, since a technique for dividing one screen and reproducing a plurality of images in a digital TV, divides one screen as described above reproduces each image on the divided screen, a size of an image is reduced. Also, only images are separated in the conventional technique, and voices are not separated.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for providing a DMB service using an external device and a digital TV.

Another aspect of the present invention is to provide an apparatus and a method for connecting an external device with a digital TV and thereby providing a Multi Mode Service (MMS) in a DMB system.

In accordance with an aspect of the present invention, a method for supporting a MultiMode Service (MMS) in a digital TeleVision (TV) is provided. The method includes determining whether a received broadcast channel supports an MMS, when the broadcast channel supports the MMS, setting one of subchannels included in the broadcast channel to a main channel, reproducing, at the digital TV, a broadcast signal of the main channel, and transmitting broadcast signals of subchannels excluding the main channel to at least one external device coupled to the digital TV.

In accordance with another aspect of the present invention, a method for supporting a MultiMode Service (MMS) in an external device is provided. The method includes when a broadcast view event occurs, receiving a broadcast signal of a subchannel from a digital TeleVision (TV) coupled to the external device, and reproducing the received broadcast signal.

In accordance with still another aspect of the present invention, an apparatus for supporting a MultiMode Service (MMS) in a digital TeleVision (TV) is provided. The apparatus includes a signal processor for determining whether a received broadcast channel supports the MMS, when the broadcast channel supports the MMS, sets one of subchannels included in the broadcast channel to a main channel, and controls the digital TV to reproduce a broadcast signal from the main channel, and an interface controller for transmitting broadcast signals of subchannels excluding the main channel to at least one external device coupled to the digital TV.

In accordance with further another aspect of the present invention, an apparatus for supporting a MultiMode Service (MMS) in an external device is provided. The apparatus includes a receiver for, when a broadcast view event occurs, receiving a broadcast signal of a subchannel from a digital TeleVision (TV) coupled to the external device, and a reproducing unit for reproducing the received broadcast signal.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent to those skilled in the art from the following description taken in conjunction with the accompanying drawings in which.

Throughout the drawings, like reference numerals will be understood to refer to like parts, components and structures.

DETAILED DESCRIPTION OF THE INVENTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Further, descriptions of well-known functions and constructions are omitted for clarity and conciseness.

Note that the terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

Exemplary embodiments of the present invention provide an apparatus and a method for connecting a digital TV with an external device and providing an MMS in a DMB system. The external device according to an exemplary embodiment of the present invention includes all electronic devices having a display unit, and may be a cellular phone, a Portable Multimedia Player (PMP), a Personal Digital Assistant (PDA), a Motion Picture Expert Group Audio Layer-3 (MP3) player, a computer, etc. In addition, in the case of supporting an MMS, description will be made using a case where three subchannels are included in one broadcast channel for illustrative purpose. Thus, it should be noted that other number of subchannels may be used according to the teachings of the present invention.

Figure 1:
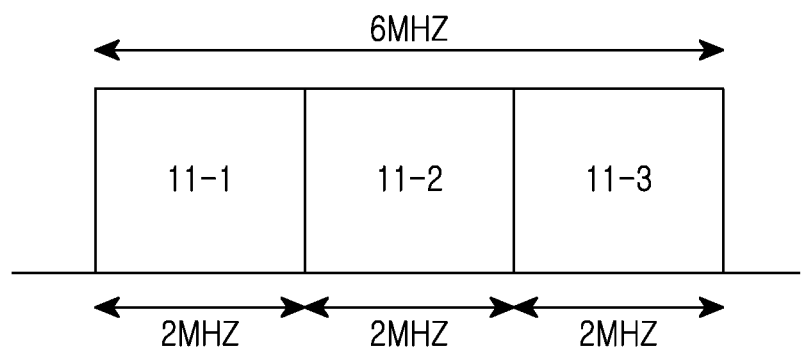
FIG. 1 is a view illustrating a broadcast channel technique according to a Multi Mode Service (MMS)
Figure 2:
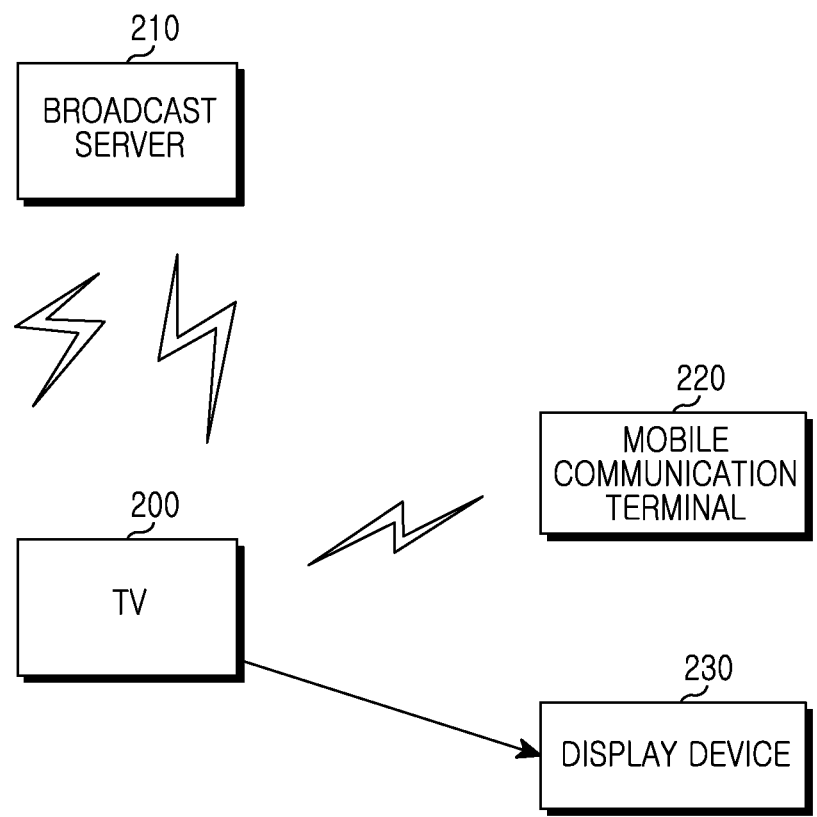
FIG. 2 is a block diagram illustrating a DMB system according to an exemplary embodiment of the present invention.

FIG. 2 is a block diagram illustrating a DMB system according to an exemplary embodiment of the present invention.

Referring to FIG. 2, a digital TV 200 receives signals from a broadcast channel from a broadcast server 210 and determines whether the broadcast channel supports a Multi Mode Service (MMS). When the broadcast channel supports the MMS, the digital TV 200 sets one of three subchannels included in the broadcast channel to a main channel. After that, the digital TV 200 reproduces a broadcast signal of the set main channel via a screen of the digital TV 200, and transmits broadcast signals of subchannels excluding the main channel to external devices 220 and 230, which are in communication or communicatively coupled to the digital TV 200. The digital TV 200 and the external devices 220 and 230 may be in communication via wired lines such as a Universal Serial Bus (USB), D-sub, a Digital Visual Interface (DVI), and a High Definition Multimedia Interface (HDMI), or a near filed wireless communication scheme such as a wireless Local Area Network (LAN), Bluetooth, and Zigbee, so that the digital TV 200 transmits the broadcast signals to the external devices 220 and 230 according to a preset connection scheme.

For example, when a broadcast channel No. 11 having subchannels 11-1,11-2, and 11-3 which the digital TV 200 desires to receive supports of an MMS, the digital TV 200 sets the subchannel 11-1 of the three subchannels as a main channel, and reproduces a broadcast signal received from the channel 11-1 on a screen of the digital TV 200, and meanwhile receives broadcast signals from the subchannels 11-2 and 11-3 and transmits those broadcast signals to the mobile communication terminal 220 connected via Bluetooth and the display device 230 connected via a USB, The mobile communication terminal 220 and the display device 230 receive broadcast signals from the digital TV 200 according to the preset connection scheme 10 with the digital TV 200, and reproduce the received broadcast signals accordingly.

Figure 3:
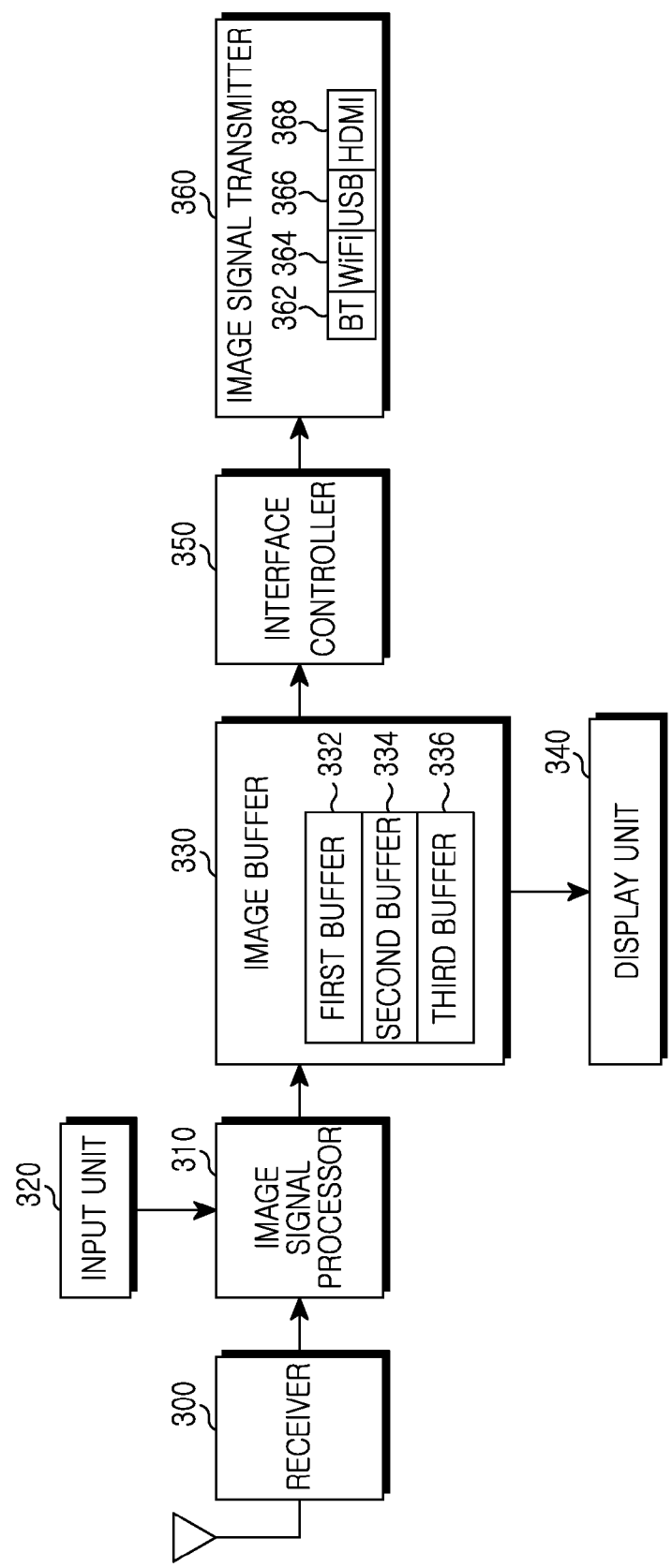
FIG. 3 is a block diagram illustrating a digital TV in a DMB system according to an exemplary embodiment of the present invention.

FIG. 3 is a block diagram illustrating a digital TV in a DMB system according to an exemplary embodiment of the present invention.

Referring to FIG. 3, the digital TV includes a receiver 300, an image signal processor 310, an input unit 320, an image buffer 330, a display unit 340, an interface 15 controller 350, and an image signal transmitter 360.

The receiver 300 receives a signal of a broadcast channel from a broadcast server and provides the received signal to the image signal processor 310.

The image signal processor 310 decodes an input image signal according to a predetermined scheme, and outputs the same to the image buffer 330. More particularly, according to an exemplary embodiment of the present invention, the image signal processor 310 decodes a signal of a broadcast channel provided from the receiver 300 to determine whether the broadcast channel supports an MMS using the header information. When the broadcast channel supports the MMS, the image signal processor 310 sets one of subchannels of the broadcast channel to a main channel. The main channel may be set according to a predetermined method, or set by a user's selection via the input unit 320. In addition, when the broadcast channel supports the MMS, the image signal processor 310 controls to divide the image buffer 330 into three regions, controls to output image signals from a subchannel set to the main channel from the image buffer 330 to the display unit 340, and controls to output image signals of the other subchannels to the interface controller 350. In contrast, when the broadcast channel does not support the MMS, the image signal processor 310 provides signals of the broadcast channel to the image buffer 330 and controls to output the signals to the display unit 340.

The image buffer 330 buffers input image signals and provides the image signals to the display unit 340 or the interface controller 350 under control of the image signal processor 310. When the broadcast channel supports the MMS, the image buffer 330 divides a buffer region into three buffer regions 332, 334, and 336, buffers image signals of each subchannel using the respective buffer, outputs image signals of a subchannel set to the main channel to the display unit 340, and provides image signals of the other subchannels to the interface controller 350 under control of the image signal processor 310. Note that the three buffer regions 332, 334, and 336 of the image buffer 330 are not discriminated as physical regions but discriminated as logical regions.

The interface controller 350 detects connection and a connection scheme with external devices, converts RGB image data of each subchannel provided from the image buffer 330 so that the image data is suitable for an interface corresponding to the connection scheme, and provides the converted image data to the image signal transmitter 360.

Figure 4:
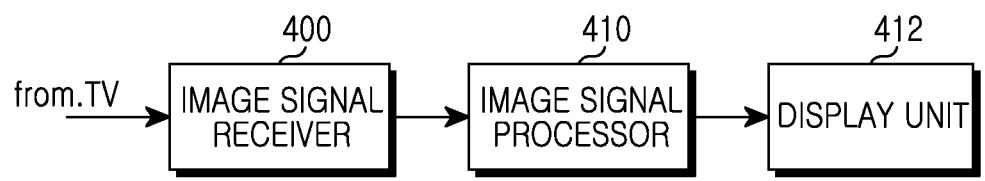
FIG. 4 is a block diagram illustrating an external device in a DMB system according to an exemplary embodiment of the present invention.

The image signal transmitter 360 transfers the image signal converted by the interface controller 350 to the external devices according to the connection scheme. For example, when the digital TV supports a Bluetooth (BT) 362, Wireless Fidelity (WiFi) 364, a USB 366, and an HDMI 368, the image signal transmitter 360 transfers the image signal to the external devices using one of schemes. FIG. 4 is a block diagram illustrating an external device in a DMB system according to an exemplary embodiment of the present invention.

Referring to FIG. 4, the external device includes an image signal receiver 400, an image signal processor 410, and a display unit 412.

The image signal receiver 400 receives an image signal from a digital TV via a wired line or wirelessly and provides the received image signal to the image signal processor 410.

The image signal processor 410 converts the image signal received from the digital TV so that the image signal is suitable for a screen of the external device, then provides the converted image signal to the display unit 412.

Finally, the display unit 412 displays the image signal converted by the image signal processor 410.

Figure 5:
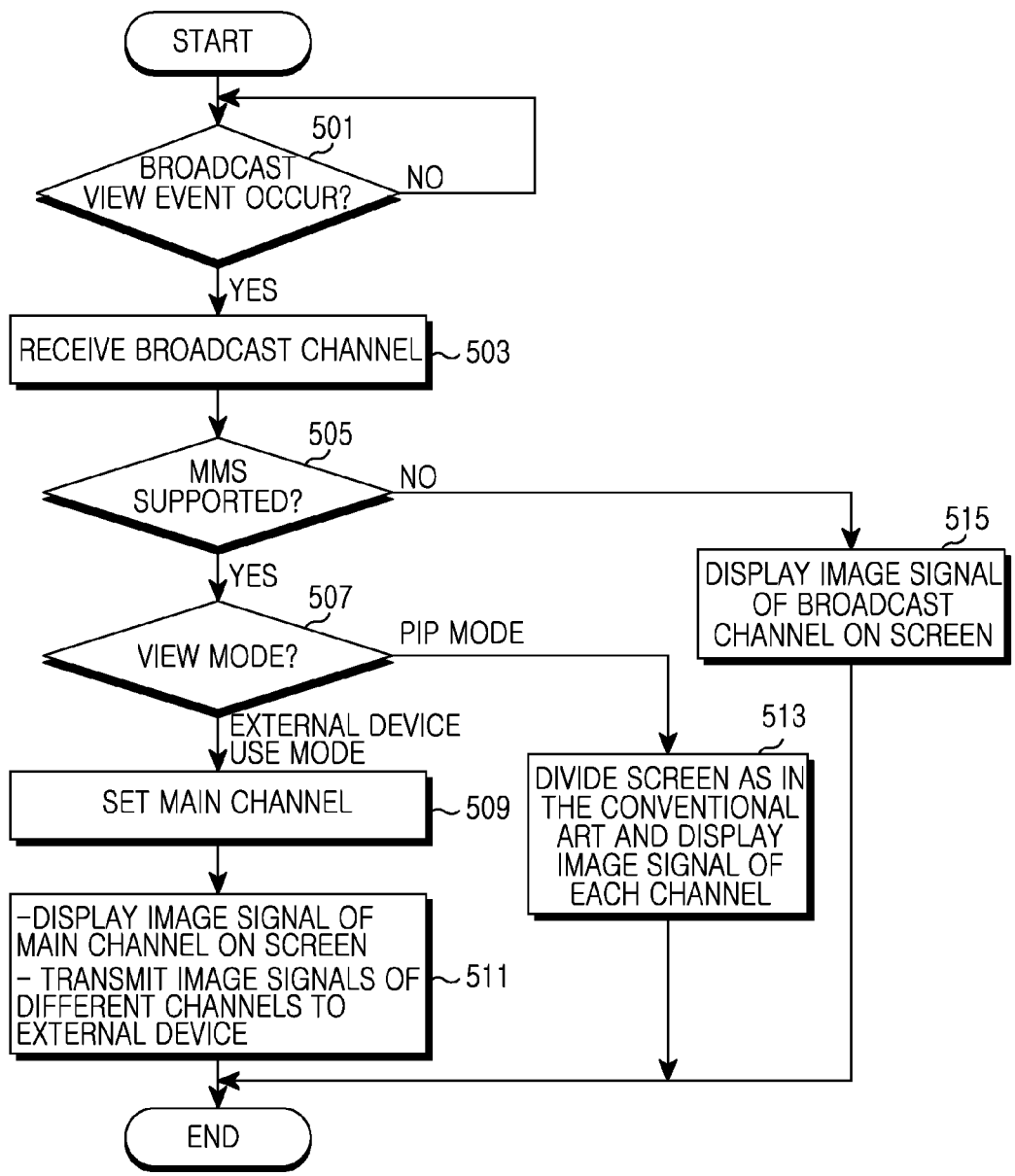
FIG. 5 is a flowchart illustrating a procedure for operating a digital TV in a DMB system according to an exemplary embodiment of the present invention.

FIG. 5 is a flowchart illustrating a procedure for operating a digital TV in a DMB system according to an exemplary embodiment of the present invention.

Referring to FIG. 5, the digital TV determines whether a broadcast view event occurs in step 501. When the broadcast view event occurs in step 501, the digital TV receives and decodes a relevant broadcast channel in step 503.

The digital TV determines whether the broadcast channel supports an MMS with reference to header information of a signal of the received broadcast channel in step 505. When the broadcast channel does not support the MMS, the digital TV displays an image of the broadcast channel on a screen of the digital TV in step 515. Here, the digital TV continuously performs step 515 until the broadcast view event terminates, and when the broadcast view event terminates, ends the present algorithm according to an exemplary embodiment of the present invention.

In contrast, when the broadcast channel supports the MMS, the digital TV determines a view mode set by a user in step 507. When the view mode set by the user is an external device use mode, the digital TV sets one of subchannels of the broadcast channel to a main channel in step 509. Here, the main channel may be set and selectively changed by the user. The digital TV displays an image signal of the subchannel set to the main channel on a screen, and transmits image signals of the other subchannels excluding the main channel to an external device in communication with the digital TV in step 511. At this point, the digital TV transmits the image signals of the subchannels to the external device according to a connection scheme to the external device. For example, in the case where the digital TV is connected with a mobile communication terminal via a USB, the digital TV transmits the image signals to the mobile communication terminal via the USB. In the case where the digital TV is connected with a mobile communication terminal via Bluetooth, the digital TV transmits the image signals to the mobile communication terminal via the Bluetooth. Here, the digital TV constantly performs step 511 until a broadcast view event terminates. When the broadcast view event terminates, the digital TV ends the present algorithm according to an exemplary embodiment of the present invention.

Note that when the view mode set by the user is a Picture In Picture (PIP) mode, the digital TV divides a screen of the digital TV as in the conventional art and displays an image signal of each subchannel on each divided screen in step 513. The digital TV constantly performs step 513 until a broadcast view event terminates, and when the broadcast view event terminates, ends the present algorithm according to an exemplary embodiment of the present invention.

Figure 6:
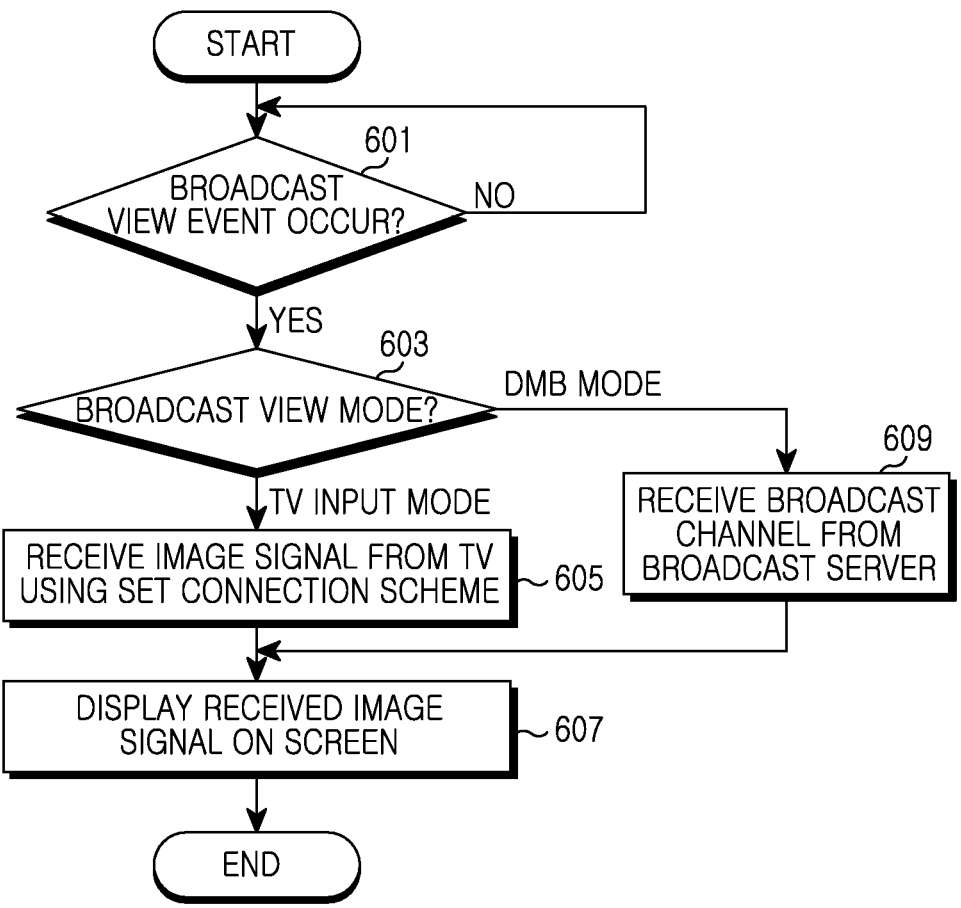
FIG. 6 is a flowchart illustrating a procedure for operating an external device in a DMB system according to an exemplary embodiment of the present invention.

FIG. 6 is a flowchart illustrating a procedure for operating an external device in a DMB system according to an exemplary embodiment of the present invention.

Referring to FIG. 6, the external device determines whether a broadcast view event occurs in step 601. When the broadcast view event occurs in step 601, the external device determines a broadcast view mode in step 603.

When the broadcast view mode is a TV input mode, the external device receives an image signal from a digital TV connected with the external device according to a predetermined connection scheme in step 605, processes the received image signal so that the image signal is suitable for a screen of the external device, and displays the processed image signal in step 607. Here, the external device constantly performs steps 605 and 607 until the broadcast view event terminates, and when the broadcast view event terminates, ends the present algorithm according to an exemplary embodiment of the present invention.

When the broadcast view mode is a DMB mode, the external device receives a broadcast channel from a broadcast server using a DMB function provided inside the external device in step 609, and processes a received broadcast signal so that the broadcast signal is suitable for the screen of the external device, and displays the processed broadcast signal in step 607. Here, the external device constantly performs steps 609 and 607 until the broadcast view event terminates, and when the broadcast view event terminates, ends the present algorithm according to an exemplary embodiment of the present invention.

In the above description, an image signal of a broadcast signal has been described as an example, but it should be noted that the teachings of the present invention is also applicable to a voice signal.

According to an exemplary embodiment of the present invention, when a DMB system supports an MMS, a digital TV and an external device are connected via a wired line or wirelessly. The digital TV and the external device reproduce, respectively, a plurality of signals from one broadcast channel received by the digital TV, so that a user can view a plurality of screens from one broadcast channel without dividing a screen. Note that not only a plurality of images but also a plurality of voices from one broadcast channel can be provided.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer is loaded with, or accesses, code that may be stored in a memory component, the general purpose computer is transformed into a special purpose computer suitable for at least executing and implementing the processing shown herein.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. A method comprising:
receiving, at a first device, a signal of a channel having a plurality of portions, each of the plurality of portions corresponding to at least one of a plurality of multimedia data;
outputting, at the first device, a first multimedia data corresponding to a first portion of the plurality of portions; and
transmitting, from the first device to a second device, a second multimedia data corresponding to only a second portion of the plurality of portions of the signal of the channel output by the first device, such that the second multimedia data is to be displayed at the second device,
wherein the second multimedia data corresponding to the second portion of the plurality of portions of the signal of the channel is to be transmitted to the second device, while the first multimedia data is being output at the first device, and
wherein the second multimedia data is to be displayed at the second device.

2. The method of claim 1, wherein the receiving comprises:
receiving the signal from a third device.

3. The method of claim 1, wherein the receiving comprises:
receiving the signal as a broadcasted signal.

4. The method of claim 1, further comprising:
dividing a region of a buffer coupled to the first device based at least in part on a number of the plurality of portions.

5. The method of claim 4, wherein the dividing comprises:
storing the first multimedia data to a first area of the region; and
storing the second multimedia data to a second area of the region.

6. The method of claim 1, wherein the receiving comprises:
determining whether the signal supports a multimode service in which a plurality of different multimedia data is provided.

7. The method of claim 6, wherein the determining is based at least in part on header information included in the signal.

8. The method of claim 1, wherein the receiving comprises:
identifying the first portion based at least in part on a user input.

9. The method of claim 1, wherein the outputting comprises:
displaying the first multimedia data simultaneously with transmitting the second multimedia data.

10. The method of claim 1, wherein the transmitting comprises:
identifying connection information between the first device and the second device; and
transforming a format of the second multimedia data from a first format to a second format based at least in part on the connection information.

11. An apparatus comprising:
a signal processor to identify a first portion of a plurality of portions included in a signal of a channel, each of the plurality of portions corresponding to at least one of a plurality of multimedia data, and to output a first multimedia data of the plurality of multimedia data corresponding to the first portion of the plurality of portions; and
an interface controller to transmit a second multimedia data of the plurality of multimedia data corresponding to a second portion of the plurality of portions to an external device, such that the second multimedia data is to be displayed at the external device,
wherein the second multimedia data corresponding to the second portion of the plurality of portions of the signal of the channel is transmitted to the device, while the first multimedia data is being output at the apparatus, and
wherein the second multimedia data is to be displayed at the external device.

12. The apparatus of claim 11, further comprising:
a receiver to receive the signal from another device external to the apparatus.

13. The apparatus of claim 11, wherein the apparatus and the device are communicatively coupled using wired communication or near field wireless communication.

14. The apparatus of claim 11, wherein the first multimedia data is a first image data or a first sound data corresponding to a first direction and the second multimedia data is a second image data or a second sound data corresponding to a second direction.

15. The apparatus of claim 11, wherein the signal processor is configured to:
partition a region of a buffer based at least in part on a number of the plurality of portions.

16. The apparatus of claim 11, wherein the signal processor is configured to:
store the first multimedia data to a first area of a region of a buffer; and
store the second multimedia data to a second area of the region.

17. The apparatus of claim 11, wherein the signal processor is configured to:
identify connection information between the apparatus and the external device; and
transform a format of the second multimedia data into a first format based on determining that the connection information indicates a first communication type, and a second format based on determining that the connection information indicates a second communication type.

18. The apparatus of claim 17, wherein the signal processor is configured to:
transmit the second multimedia data the external device in the first format or the second format transformed from the format.

19. The apparatus of claim 11, further comprising:
a display to display the first multimedia data.

20. A non-transitory machine-readable storage device storing instructions that, when executed by one or more processors, cause the one or more processors to perform operations comprising:
identifying, at a first device, a first portion of a plurality of portions included in a signal or a channel, each of the plurality of portions corresponding to at least one of a plurality of multimedia data;
outputting, a first multimedia data of a plurality of multimedia data corresponding to the first portion;
transmitting a second multimedia data of the plurality of multimedia data to a second device, the second multimedia data corresponding to a second portion of the plurality of portion, such that the second multimedia data is to be displayed at the second device, wherein the second multimedia data corresponding to the second portion of the plurality of portions of the signal of the channel is transmitted to the second device, while the first multimedia data is being output, and wherein the second multimedia data is to be displayed at the second device.

21. The device of claim 20, further comprising:

setting one of the plurality of portions to a main channel for outputting, at the first device, the first multimedia data.

22. The method of claim 21, wherein the setting comprises:

determining the main channel according to a predetermined method, or selecting via an input unit.

* * * * *

UNITED STATES PATENT AND TRADEMARK OFFICE
CERTIFICATE OF CORRECTION

Page 1 of 1

PATENT NO.           : 9,049,401 B2
APPLICATION NO.      : 13/908231
DATED                : June 2, 2015
INVENTOR(S)          : Cheol-Sun Yoo It is certified that error appears in the above-identified patent and that said Letters Patent is hereby corrected as shown below:

In the Claims

Column 7, Claim 1, Line 20 should read as follows:
--...corresponding to a second...--

Column 7, Claim 8, Line 50 should read as follows:
--...wherein the outputting comprises...--

Column 8, Claim 18, Lines 49-50 should read as follows:
--...second format based on the format...--

Column 8, Claim 20, Line 61 should read as follows:
--...data of the plurality...--

Signed and Sealed this
Twenty-ninth Day of September, 2015

Michelle K. Lee
*Director of the United States Patent and Trademark Office*